United States Patent [19]

Reik

[11] Patent Number: 4,601,376

[45] Date of Patent: Jul. 22, 1986

[54] FRICTION CLUTCH

[75] Inventor: Wolfgang Reik, Bühl/Baden, Fed. Rep. of Germany

[73] Assignee: Luk Lamellen und Kupplungsbau GmbH, Bühl/Baden, Fed. Rep. of Germany

[21] Appl. No.: 543,383

[22] Filed: Oct. 19, 1983

[30] Foreign Application Priority Data

Nov. 11, 1982 [DE] Fed. Rep. of Germany ....... 3241709

[51] Int. Cl.[4] .............................................. F16D 13/44
[52] U.S. Cl. ................................ 192/89 B; 192/70.27; 267/161; 267/181
[58] Field of Search ............... 192/70.28, 70.27, 70.18, 192/89 B; 267/158, 161, 164, 181, 162, 163

[56] References Cited

U.S. PATENT DOCUMENTS

| 2,202,132 | 5/1940 | Wood | 192/70.27 |
|---|---|---|---|
| 2,219,139 | 10/1940 | Nutt et al. | 192/89 B |
| 2,359,184 | 9/1944 | Wolfram | 192/70.27 |
| 3,237,739 | 3/1966 | Pritchard | 192/89 B |
| 3,340,973 | 9/1967 | Maucher | 192/89 B |
| 3,450,241 | 6/1969 | Kuno | 192/70.18 |
| 3,712,435 | 1/1973 | Kraus | 192/70.27 |
| 4,126,216 | 11/1978 | Babcock et al. | 267/161 |
| 4,254,853 | 3/1981 | Huber | 792/70.27 |
| 4,300,669 | 11/1981 | Browne | 192/89 B |
| 4,365,697 | 12/1982 | Hönemann | 192/89 B |
| 4,491,211 | 1/1985 | Sky | 192/89 B |
| 4,496,137 | 1/1985 | Reik | 267/171 |

FOREIGN PATENT DOCUMENTS 3017563 11/1981 Fed. Rep. of Germany ... 192/70.27

Primary Examiner—Samuel Scott
Assistant Examiner—Helen Ann Odar
Attorney, Agent, or Firm—Peter K. Kontler

[57] ABSTRACT

A friction clutch whose diaphragm spring has equidistant prongs extending axially and radially from the energy-storing annular main section and being bolted directly to the flywheel on the crankshaft of an engine so that the spring normally biases a pressure plate against a clutch disc and the latter is thereby biased against the flywheel. The spring has alternating tongues and slots extending radially inwardly from the annular main section as well as an annulus of arcuate openings between the outermost portions of the slots and the prongs. The openings enhance the flexibility of the conical frustum which is constituted by the annular main section and the tongues with reference to the conical frustum including the prongs, and the openings thus prolong the useful life of the diaphragm spring.

19 Claims, 5 Drawing Figures

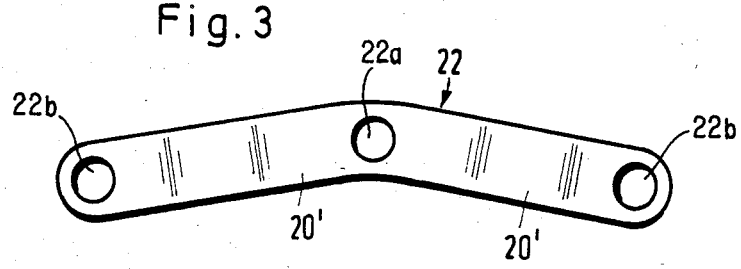
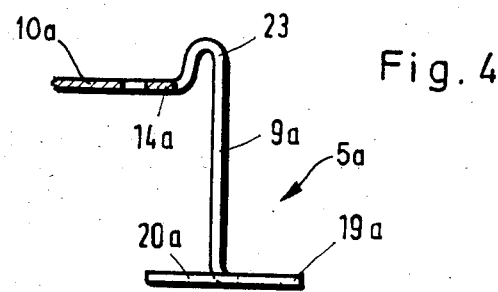
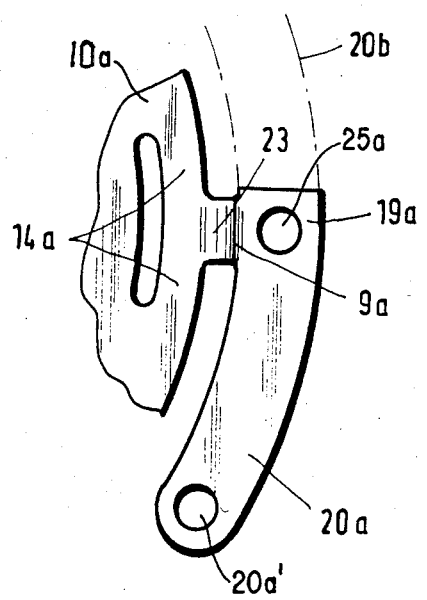

FRICTION CLUTCH

CROSS-REFERENCE TO RELATED CASE

The friction clutch which is disclosed in the present application is somewhat similar to the friction clutch which is disclosed in my commonly owned copending patent application Ser. No. 531,930 filed Sept. 13, 1983 for "Friction clutch and diaphragm spring therefor".

BACKGROUND OF THE INVENTION

The present invention relates to friction clutches in general, particularly to pull-type friction clutches wherein the radially inwardly extending tongues of the diaphragm spring must be pulled in order to disengage one or more clutch discs from one or more pressure plates.

Diaphragm springs for use in friction clutches are normally provided with the aforementioned tongues which extend substantially radially inwardly from the energy-storing annular main section of the spring and which alternate with substantially radially extending slots communicating with a centrally located opening. It is further known to provide such types of diaphragm springs with prongs which extend radially outwardly of the main section and can be used as a means for facilitating attachment of the diaphragm spring to the flywheel on the crankshaft of the engine in an automotive vehicle. The diaphragm spring bears against the pressure plate in the region of its main section to thereby urge the pressure plate against the clutch disc when the clutch is engaged. A similar friction clutch is disclosed, for example, in German Pat. No. 19 43 336 wherein the diaphragm spring has radially outwardly extending slotted prongs which serve as a means for facilitating prestressing of the spring by bolting the prongs to the flywheel to thereby urge the main section of the spring against protuberances on the adjacent pressure plate. The prongs are designed to roll along suitable surfaces and such rolling takes place when the conicity of the diaphragm spring (inclusive of the main section and prongs) is changed for the purpose of engaging or disengaging the clutch. An advantage of such friction clutches is their simplicity. However, the wear upon the prongs and upon the surface which are in rolling contact with the prongs is rather pronounced with the result that the extent of deformation of the diaphragm spring (for the purpose of engaging or disengaging the clutch) must be increased proportionally with the increasing wear upon the prongs.

German Offenlegungsschrift No. 30 17 563 discloses a modified friction clutch wherein the prongs of the diaphragm spring are fixedly secured to the flywheel without any freedom of rolling movement. When the clutch is to be disengaged, the radially inwardly extending tongues of the diaphragm spring are acted upon in such a way that the conicity of the spring is changed whereby the prongs are flexed with reference to the adjacent portions of the flywheel. This entails the development of frequently recurring stresses which shorten the useful life of the diaphragm spring. The design of the prongs is not best suited to enable the prongs to stand such stresses. Additional pronounced stresses develop in the regions where the prongs merge into the main section of the diaphragm spring, and such stresses are superimposed upon stresses which normally develop in the main section. Such superimposition of stresses is attributable to the fact that the diaphragm spring which is disclosed in the just mentioned German publication does not allow for flexing of the radially innermost portions of prongs with reference to the annular main section and/or vice versa. Thus, the main section undergoes deformation in the regions of merger of the prongs whenever the diaphragm spring is caused to change its conicity for the purpose of engaging or disengaging the clutch. The situation is aggravated because the prongs are relatively short, as considered in the radial direction of the diaphragm spring; this contributes to the development of very pronounced stresses which are superimposed upon the normally developing stresses in the main section of the spring. The result is a substantial shortening of the useful life of the diaphragm spring and, as a rule, of the friction clutch which embodies the spring.

OBJECTS AND SUMMARY OF THE INVENTION

An object of the invention is to provide a novel and improved friction clutch, especially a pull-type friction clutch, wherein the diaphragm spring is constructed and assembled with other components of the clutch in such a way that the prongs cannot transmit appreciable additional stresses to the main section of the diaphragm spring.

Another object of the invention is to provide a diaphragm spring whose useful life is longer than that of heretofore known diaphragm springs for use in friction clutches or the like.

An additional object of the invention is to provide a friction clutch wherein the changes in conicity of the main section of the diaphragm spring do not entail any, or any appreciable, changes in the orientation of prongs.

A further object of the invention is to provide a diaphragm spring which can be used in certain presently known friction clutches as a superior, especially longer-lasting, substitute for heretofore known diaphragm springs.

Another object of the invention is to provide a friction clutch which exhibits the aforementioned features and embodies the aforementioned advantages and whose cost is a fraction of the cost of conventional clutches.

A further object of the invention is to provide a novel and improved method of assembling the components of the above outlined friction clutch.

An additional object of the invention is to provide a friction clutch wherein the prongs of the diaphragm spring can be fixedly secured to a flywheel or the like but such mounting of the diaphragm spring does not entail additional and excessive stressing of the main section of the spring.

Another object of the invention is to provide a diaphragm spring which can stand a much larger number of recurrent dynamic stresses than heretofore known diaphragm springs.

An ancillary object of the invention is to provide novel and improved means for subjecting the diaphragm spring to initial stresses prior to complete assembly of the friction clutch wherein the diaphragm spring is put to use.

The invention is embodied in a friction clutch which can be attached to a rotary torque-transmitting element, such as the flywheel on the crankshaft of an engine in a motor vehicle, particularly in a pull-type friction clutch which comprises a diaphragm spring having an annular main section, alternating tongues and slots extending inwardly from the main section, prongs extending outwardly from the main section and adapted to be secured to the torque-transmitting element, and openings disposed intermediate the slots and the prongs, as considered in the radial direction of the main section. The clutch further comprises a pressure plate which is movable axially of the torque-transmitting element (when the latter is connected with the prongs of the diaphragm spring) under or against the bias of the diaphragm spring, and a clutch disc which is adjacent to the pressure plate and is biased by the latter when the prongs of the diaphragm spring are secured to the torque-transmitting element and the pressure plate is biased by the diaphragm spring. The latter includes a portion which is disposed inwardly of the prongs and serves to bias the pressure plate toward the clutch disc so that the latter is held in frictional torque-receiving engagement with the torque-transmitting element.

Each of the openings is preferably of arcuate shape and each prong is preferably disposed radially outwardly of a different opening. Each such opening preferably includes first and second end portions which respectively extend clockwise and counterclockwise beyond the respective prong, as considered in the circumferential direction of the main section of the diaphragm spring. The length of the first and second end portions of each opening preferably exceeds half the width of the respective prong, as considered in the circumferential direction of the main section of the diaphragm spring. The combined length of all openings, as considered in the circumferential direction of the main section, at most equals two-thirds of that annular portion of the diaphragm spring which is provided with the openings. The openings can be disposed radially inwardly of the main section.

The main section constitutes or forms part of a first conical frustum (such conical frustum can further include the tongues), and the prongs constitute or form part of a second conical frustum whose conicity deviates from that of the first conical frustum. The spring further includes intermediate portions which are disposed in the region of the openings and constitute torsion zones between the two conical frusta. The torque-transmitting element is normally provided with a first annulus of holes for threaded shanks of fasteners which connect the prongs to the torque-transmitting element, and the prongs are then provided with a second annulus of holes which also receive portions of such fasteners when the diaphragm spring is properly secured to the torque transmitting element. In accordance with a feature of the invention, the diameter of the second annulus exceeds the diameter of the first annulus prior to attachment of prongs to the torque-transmitting element, i.e., the prongs must be moved radially inwardly so as to place their holes into register with the corresponding holes of the torque transmitting element before the diaphragm spring is attached to such element. The intermediate portions of the diaphragm spring are twisted when the prongs are secured to the torque-transmitting element so that the diameter of the second annulus of holes matches the diameter of the first annulus of holes. The diaphragm spring is flexible in the region of its intermediate portions in response to changes in conicity of at least one of the conical frusta, e.g., in response to shifting of the tips of tongues in the axial direction of the diaphragm spring to disengage the friction clutch by causing the diaphragm spring to relax the pressure upon the pressure plate so that the latter ceases to urge the clutch disc into frictional engagement with the torque-transmitting element.

The diaphragm spring is preferably further provided with substantially strip-shaped extensions which can constitute leaf springs and in their entirety extend substantially circumferentially of the annular main section. Such extensions can constitute integral parts of the diaphragm spring and can be spaced apart from the main section. Means (e.g., rivets, bolts or screws) can be provided to secure the extensions of the diaphragm spring to the pressure plate. Each such extension can have an arcuate shape, and the extensions can be provided on the prongs.

The number of tongues can exceed the number of prongs and each prong can be aligned with one of the slots, as considered in the radial direction of the main section. The prongs can be configured in such a way that each thereof comprises a first portion which extends substantially axially of the main section and a second portion disposed at that end of the respective first portion which is remote from the main section and extending substantially radially of the main section.

The novel features which are considered as characteristic of the invention are set forth in particular in the appended claims. The improved friction clutch itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 3 illustrates a two-armed extension which is separably or permanently connectable to a prong of the diaphragm spring in the friction clutch of FIGS. 1 and 2;

FIG. 4 is a sectional view, substantially as seen in the direction of arrows from the line IV—IV of FIG. 2, but showing a portion of a somewhat modified diaphragm spring which can be used in the friction clutch of the present invention; and FIG. 5 is a plain view of the structure which is shown in FIG. 4.

DESCRIPTION OF THE PREFERRED EMBODIMENTS

Figure 1:
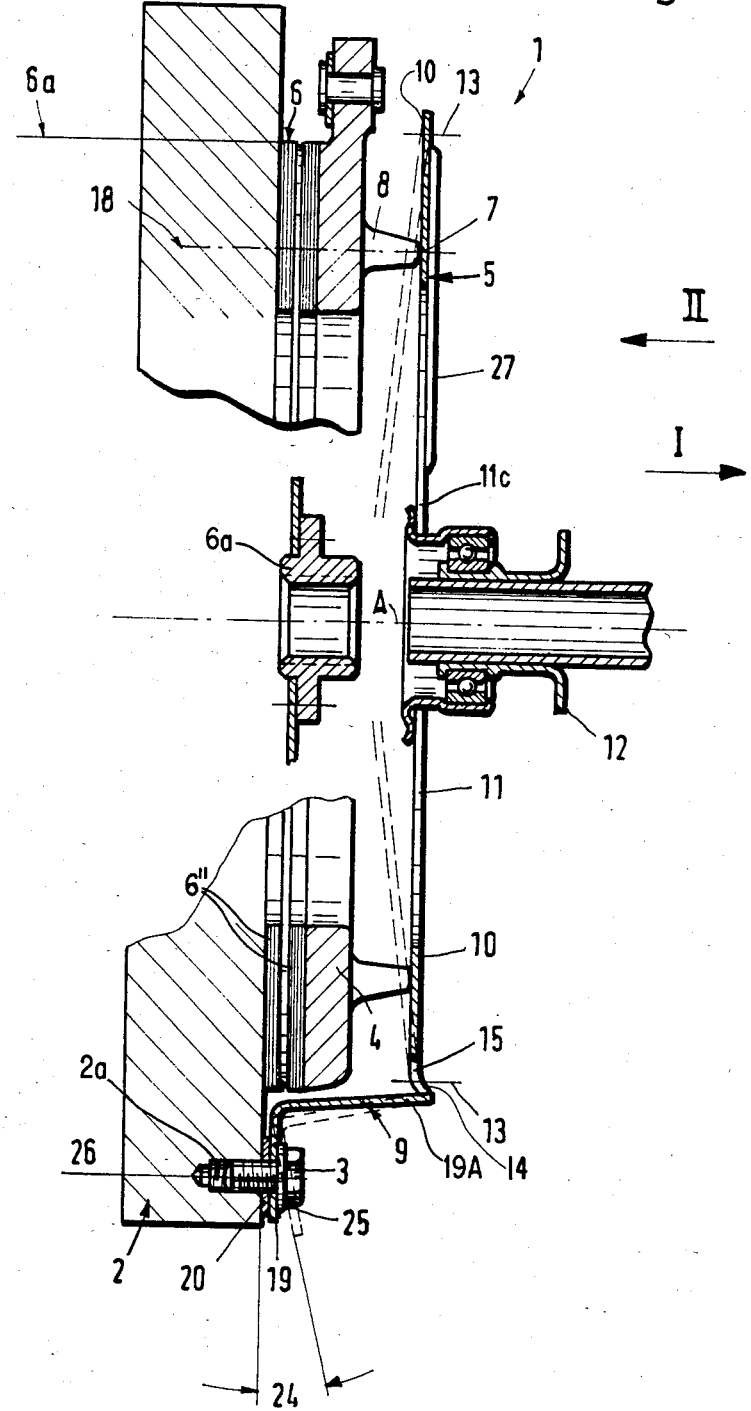
FIG. 1 is a fragmentary axial sectional view of a friction clutch which embodies one form of the invention.
Figure 2:
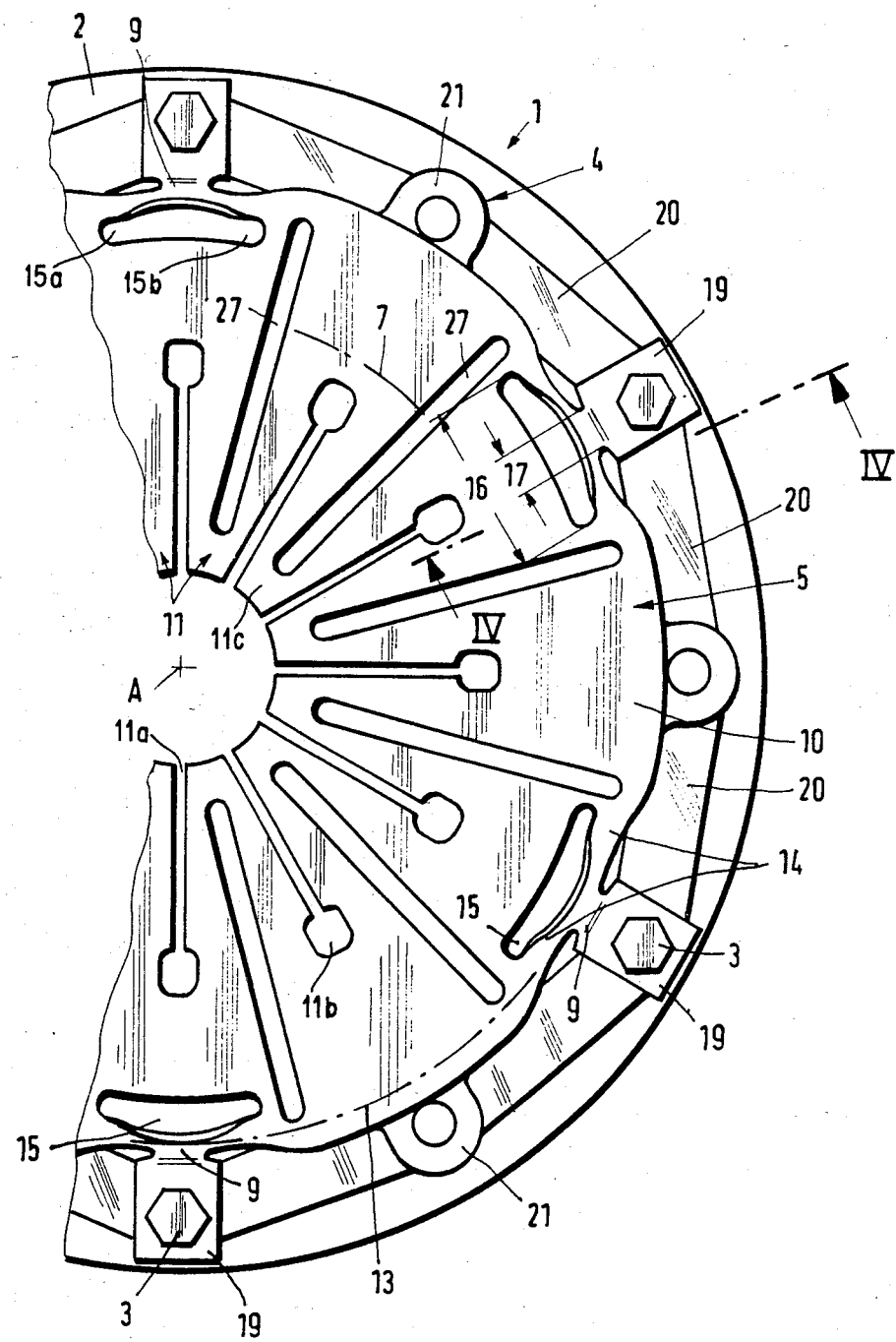
FIG. 2 is a fragmentary plan view of the clutch substantially as seen in the direction of arrow II in FIG. 1.

The friction clutch 1 which is shown in FIGS. 1 and 2 is mounted on a torque-transmitting element 2 constituting the flywheel on the crankshaft of an internal combustion engine for motor vehicles. The means for fastening the diaphragm spring 5 of the friction clutch 1 to the flywheel 2 comprises an annulus of threaded fasteners in the form of bolts 3 whose shanks extend into tapped bores or holes 2a close to the marginal portion of the flywheel. The friction clutch 1 further comprises a pressure plate 4 which is disposed between the annular main portion 10 of the diaphragm spring 5 and the flywheel 2, and a clutch disc or clutch plate 6 which is disposed between the flywheel 2 and the pressure plate 4 and is biased against the flywheel when the clutch is engaged, namely, when the diaphragm spring 5 is free to urge the pressure plate 4 against the friction linings 6' of the disc 6 so that one friction lining is in frictional contact with the pressure plate and the other friction lining is in frictional contact with the flywheel. The hub 6a of the clutch disc 6 can transmit torque to the input element of a change-speed transmission, not shown, in a manner not forming part of the invention. The pressure plate 4 is movable axially of the flywheel 2 into and from frictional engagement with the adjacent lining 6' of the disc 6. As can be seen in FIG. 1, the pressure plate 4 has an annulus of axially extending protuberances 8 which are in contact with adjacent portions 7 of the diaphragm spring 5.

The diaphragm spring 5 comprises the aforementioned annular main section 10 and a set of radially inwardly extending tongues 11 alternating with radially extending slots 11a having enlarged radially outermost portions 11b inwardly adjacent to the main section 10. Furthermore, the diaphragm spring 5 comprises an annulus of prongs 9 which extend outwardly from the main section 10 and have openings for the shanks of fasteners 3. Thus, the prongs 9 constitute the means for maintaining the friction clutch 1 in assembled condition by being secured to the flywheel 2 through the medium of the aforementioned fasteners 3 when the clutch is in use. The inner end portions or tips 11c of the tongues 11 can be engaged by a release member 12 which serves to move (when necessary) the tips 11c in the direction of the arrow I shown in FIG. 1 in order to disengage the clutch 1, i.e., to relax the pressure of portions 7 upon the protuberances 8 of the pressure plate 4 so that the latter ceases to urge the left-hand lining 6' against the adjacent surface of the flywheel 2. The means for moving the disengaging means 12 in and counter to the direction indicated by the arrow I forms no part of the invention. The construction of such moving means depends on the nature of the machine or apparatus in which the friction clutch 1 is put to use. Axial shifting of the tips 11c of tongues 11 in the direction of arrow I entails a twisting of the diaphragm spring 5 in a ring-shaped region 13 which can be said to constitute a torsion zone.

FIG. 2 shows that the prongs 9 constitute substantially L-shaped arms having first portions which extend substantially axially of the main section 10 and second portions which extend from the free ends of the respective first portions and radially outwardly of the main section 10. Each prong 9 is preferably integral with the main section 10, the same as the tongues 11. FIG. 2 further shows that the number of tongues 11 is twice the number of prongs 9 and that each prong 9 is disposed radially outwardly of one of the radially extending slots 11a. The reference character 14 denotes in FIG. 2 one of the intermediate portions which connect the prongs 9 with the main section 10 of the diaphragm spring 5. The intermediate portions 14 are adjacent to arcuate openings or windows 15 which are machined into or otherwise formed in the diaphragm spring 5 and extend circumferentially of the main section 10. Actually, the openings 15 are machined into the main section 10 and each thereof has a width, as considered in the circumferential direction of the main section, exceeding the width of a prong 9. Half the width of a prong 9 is shown in FIG. 2 at 17; and each opening 15 is located radially inwardly of a different prong and includes two end portions 15a, 15b each having a length exceeding half the width of the respective prong 9. The combined length of the openings 15 (as considered in the circumferential direction of the main section 10) is preferably less than, or at most matches, two-thirds of the circumferential length of the corresponding part of the main section 10 of the diaphragm spring. The overall length of one of the openings 15 (as considered in the circumferential direction of the main section 10) is shown at 16. The aforementioned torsion zone 13 is disposed on a diameter which is the same as or closely approximates the diameter of the intermediate portions 14 of the diaphragm spring 5. Each of the intermediate portions 14 can be said to constitute or to exhibit the characteristics of a torsion bar and undergoes deformation when the conicity of the conical frustum including the main section 10 and the tongues 11 is changed relative to that of the conical frustum constituted by the prongs 9 and/or vice versa. The elasticity of the intermediate portions 14 is preferably rather pronounced to allow for twisting of such portions when the diaphragm spring 5 is actuated to engage or disengage the friction clutch 1.

As can be seen in FIG. 1, those (second) portions 19 of the prongs 9 which are provided with openings 25 extend radially outwardly from the outermost part of the main section 10, and the annulus of intermediate portions 14 is disposed radially inwardly of the annulus of prongs 9 but radially outwardly of the annulus of protuberances 8 of the pressure plate 4. The diameter of the annulus of protuberances 8 is shown in FIG. 1, as at 18. When the clutch 1 is assembled (i.e., when the prongs 9 are bolted to the flywheel 2), the intermediate portions 14 of the diaphragm spring 5 are under torsional stress which enhances their moment of resistance against flexing in the axial direction of the friction clutch 1.

The second end portions 19 of the prongs 9 constitute eyelets which are formed with the aforementioned openings 25 for the shanks of the respective fasteners 3. FIG. 1 shows that the first portions 19A of the prongs 9 extend in the axial direction of the clutch 1 along the peripheries of the pressure plate 4 and linings 6', and the eyelets 19 are immediately adjacent to the respective side of the flywheel 2. Thus, the eyelets 19 form an annulus which is located radially outwardly of the maximum diameter (6a) of the linings 6'.

In order to ensure reliable and predictable transfer of torque between the diaphragm spring 5 and the pressure plate 4, the diaphragm spring is provided with elongated extensions 20 in the form of leaf springs which connect the prongs 9 with the pressure plate and can serve as a means for biasing the pressure plate axially of and away from the flywheel 2 so that the protuberances 8 invariably remain in contact with the respective portions 7 of the main section 10. The extensions 20 are yieldable in the axial direction of the clutch 1 but do not yield in the radial direction so that the pressure plate 4 is compelled to share all angular movements of the flywheel 2 and diaphragm spring 5 but is movable axially of the flywheel to increase or reduce the width of the space for the clutch disc 6 (as considered in the axial direction of the clutch). The pressure plate 4 has an annulus of projections 21 which alternate with the protuberances 8 and each of which is connected with two extensions 20 by a rivet or the like. The extensions 20 are integral with or adequately secured to the eyelets 19 of the neighboring prongs 9. In their entirety, the extensions 20 form a polygon which closely resembles a circle and whose sides extend between neighboring eyelets 19. An extension 20 projects from each eyelet 19 in a clockwise as well as in a counterclockwise direction, as considered in the circumferential direction of the main section 10.

FIG. 3 shows that two neighboring extensions 20 can be replaced by a two-armed extension 22. This extension has two legs 20', a central aperture 22a which can receive a fastener (such as one of the fasteners 3) to secure it to one of the prongs 9, and two additional apertures 22b at the free ends of the legs 20'. The apertures 22b can receive the shanks of rivets which are used to secure such legs to the respective projections 21 of the pressure plate 4.

Referring again to FIG. 1, the position of one of the prongs 9 in unstressed condition of the intermediate portions 14 (namely, when the prongs 9 are detached from the flywheel 2) is indicated by broken lines. It will be noted that the inclination of the first portion 19A of each prong 9 is then less pronounced than in the assembled condition of the friction clutch 1. At such time, the diameter of the annulus of openings 25 in the second portions or eyelets 19 of the prongs 9 is larger than the diameter 26 of the annulus of tapped holes or bores 2a in the flywheel 2. In other words, the diaphragm spring 5 must be deformed in order to render it possible to secure the prongs 9 to the flywheel 2. The afore-mentioned extensions 20 facilitate such attachment in that they are dimensioned in such a way that the prongs 9 are located in the solid-line positions of FIG. 1 or 2 when the extensions 20 are adequately secured to the eyelets 19 (e.g., by being made integral therewith) and to the respective projections 21 of the pressure plate 4. Thus, if the pressure plate 4 is assembled with the diaphragm spring 5 by means of extensions 20, these parts constitute a preassembled or prefabricated unit which can be readily affixed to the flywheel 2 because the diameter of the annulus of openings 25 is then identical with the diameter 26 of the annulus of holes 2a. The acute angle 24 denotes in FIG. 1 the inclination of an eyelet 19 with reference to the adjacent surface of the flywheel 2 when the diaphragm spring 5 is not connected to the flywheel and/or to the pressure plate 4. The extensions 20 are sufficiently strong to maintain the prongs 9 in the solid-line positions of FIGS. 1 and 2 as soon as they are adequately secured to the projections 21 of the pressure plate 4. The mounting of extensions 20 on the pressure plate 4 is preferably such that they are maintained in prestressed condition, namely, they tend to lift the pressure plate 4 off the clutch disc 6 so that the latter is free to rotate relative to the parts 2 and 4 or vice versa as soon as the friction clutch 1 is deactivated by way of the disengaging means 12. As mentioned above, the extensions 20 invariably maintain the protuberances 8 in contact with the adjacent portions 7 of the main section 10, irrespective of whether or not the clutch 1 is engaged.

The tongues 11 are formed with radially extending reinforcing elements 27 whose purpose is fully disclosed and claimed in the aforementioned commonly owned copending patent application Ser. No. 531,930 filed Sept. 13, 1983. Thus, such reinforcing elements ensure optimum transmission of actuating forces from the tips 11c of the tongues 11 into the main section 10 of the diaphragm spring 5 when the release member 12 is shifted in the direction of the axis A of the friction clutch 1 to disengage the pressure plate 4 from the clutch disc 6. Each reinforcing element 27 extends radially along the major part of the respective tongue 11 and radially across the major part of the main section 10. Each reinforcing element terminates short of the inner end face of the respective tip 11c and short of the radially outermost portion of the main section 10. Each opening 15 is flanked by the outermost portions of the two neighboring reinforcing elements 27.

When the operator of the friction clutch 1 desires to disengage the clutch disc 6 from the flywheel 2 and pressure plate 4, the release member 12 is shifted in the direction of the axis A as indicated by the arrow I of FIG. 1 so that the conicity of the conical frustum including the tongues 11 and the main section 10 with reference to the conical frustum including the prongs 9 changes because the intermediate portions 14 of the diaphragm spring 5 are twisted in the region 13. In other words, the intermediate portions 14 are then twisted to compensate for the change in conicity of the frustum including the parts 10 and 11.

FIGS. 4 and 5 show a portion of a modified diaphragm spring 5a having modified prongs 9a each of which includes a looped portion 23 at the junction with the annular main section 10a. This, each looped portion 23 merges into the respective intermediate portion 14a of the diaphragm spring 5a. The eyelets 19a have openings 25a for fasteners 3 (not shown in FIGS. 4 and 5) and each such eyelet is integral with one arcuate extension 20a or with two arcuate extensions 20a, 20b (the latter is indicated by phantom lines). The extensions 20a, 20b extend circumferentially of the main section 10a clockwise and counterclockwise, as viewed from the left-hand side of FIG. 5, and the apertures 20a' in their free ends (only one aperture is actually shown) correspond to the apertures 22b in the two-armed extension 22 of FIG. 3. Each of the extensions 20a, 20b constitutes a leaf spring which transmits torque between the diaphragm spring 5a and the adjacent pressure plate but allows the pressure plate to move axially of the diaphragm spring. The center of curvature of each extension 20a, 20b is preferably located on the axis of the friction clutch.

The looped portions 23 of the prongs 9a extend axially beyond one major surface of the main section 10a, and the major parts of the prongs 9a extend axially beyond the other major surface of the main section 10a.

An important advantage of the openings 15 is that they greatly enhance the flexibility of the diaphragm spring 5 or 5a in the regions radially inwardly of the prongs 9 or 9a and that they thus enable the conical frustum including the main section 10 or 10a and the tongues 11 to change its conicity with reference to the conical frustum including the prongs 9 or 9a without the transmission of appreciable additional stresses to the main section and/or to the prongs. Thus, the intermediate portions 14 or 14a compensate for such changes in conicity of one of the two conical frusta with reference to the other conical frustum. This ensures that the prongs 9 or 9a must stand or take up primarily those stresses which act upon the diaphragm spring in the axial direction of the friction clutch.

The provision of arcuate openings 15 which extend in the circumferential direction of the diaphragm spring 5 or 5a contributes to more pronounced elasticity, and hence to longer useful life, of the diaphragm spring. Such configuration of the openings 15 renders it possible to establish torsion zones and connecting zones which extend in the circumferential direction of the diaphragm spring intermediate the prongs 9 or 9a and the main section 10 or 10a which latter constitutes the energy or force storing means of the diaphragm spring. Such torsion zones or connecting zones ensure the aforediscussed compensation for the fact that the conicity of the conical frustum including the tongues 11 and the main section 10 or 10a changes relative to that of the conical frustum including the prongs 9 or 9a when the clutch is in the process of being engaged or disengaged. It has been found that the elasticity of the diaphragm spring is enhanced if the end portions 15a and 15b extend circumferentially beyond the respective prongs 9 or 9a, i.e., if each such opening extends beyond the adjacent prong in a clockwise as well as in a counterclockwise direction. This ensures the establishment of intermediate portions 14 or 14a at both sides of each and every prong 9 or 9a. It has also been ascertained that the elasticity of the intermediate portions 14 or 14a is particularly satisfactory (i.e., that the intensity of stresses which develop when the conicity of one of the conical frusta is changed does not exceed a permissible value) if the length of each of the two end portions 15a and 15b of each opening 15 (as considered in the circumferential direction of the main section 10a or 10b) equals, approximates or exceeds half the width of the adjacent prong 9 or 9a (as considered in the circumferential direction of the spring). Of course, the combined length of the openings 15 should not be such that it would adversely affect the axial rigidity of intermediate portions 14 or 14a (i.e., of the regions of transition between the main section 10 or 10a and the respective prongs 9 or 9a) and hence the operability of the friction clutch. Therefore, such combined length of the openings 15 should not exceed two-thirds of the circumference of the respective portion of the diaphragm spring 5 or 5a. It is advisable to place the openings 15 radially inwardly of the main section 10 or 10a so that the intermediate portions 14 or 14a constitute component parts of the main section. As mentioned above, the intermediate portions 14 or 14a of the main section 10 or 10a preferably constitute or are very close to the zone where the diaphragm spring 5 or 5a is flexed when the conicity of the conical frustum including the main section 10 or 10a and the tongues 11 is changed with reference to the conicity of the frustoconical portion including the prongs 9 or 9a.

The release member 12 can be replaced with other types of actuating means, e.g., by hydraulic or pneumatic motor means, especially if the diaphragm spring is prestressed in a sense to tend to move its portion 7 away from the flywheel 2, i.e., when the engagement of the clutch necessitates a deformation of the diaphragm spring by discrete actuating means. In the illustrated embodiments, the spring 5 or 5a furnishes the force which is needed to maintain the clutch in engaged condition. Such a spring is preferably designed so that the conicity of the conical frustum including the prongs 9 or 9a deviates from that of the conical frustum which includes the main section 10 or 10a and also that the intermediate portions 14 or 14a together constitute the aforediscussed torsion zone 13. The conicity of the conical frustum including the prongs 9 or 9a is much more pronounced than that of the other conical frustum. The axial rigidity of the torsion zone 13 of the diaphragm spring 5 or 5a can be enhanced by subjecting such zone to an initial stress in the aforediscussed manner, i.e., by causing the annulus of openings or holes 25 or 25a to reduce its diameter (to match the diameter 26 of the annulus of holes 2a in the flywheel 2) before the eyelets 19 or 19a of the prongs 9 or 9a can be attached to the flywheel. Such initial stressing involves a certain amount of twisting of the intermediate portions 14 or 14a so that the moment of resistance of the portions 14 or 14a to bending upon completed fastening of the eyelets 19 or 19a to the flywheel 2 is much more pronounced than when the fasteners 3 are removed and the prongs are allowed to assume their unstressed positions corresponding to that shown for one of the prongs 9 in the lower portion of FIG. 1. It has been determined that such initial stressing of the intermediate portions 14 or 14a greatly enhances their axial rigidity but does not unduly affect their elasticity which is desirable to allow for changes in the conicity of the conical frustum including the main section 10 or 10a when the clutch employing such a diaphragm spring is engaged or disengaged. The angle 24 is preferably a relatively small acute angle. This ensures that, when the diaphragm spring is properly mounted on the flywheel 2, torsional stresses in the region of the intermediate portions 14 or 14a (i.e., in the zones of transition between the main section and the prongs) do not increase appreciably at or close to the operating point of the diaphragm spring 5 or 5a.

The assembly of diaphragm spring 5 or 5a with the pressure plate 4 into a prefabricated or preassembled unit prior to attachment of eyelets 19 or 19a to the flywheel 2 is desirable and advantageous for several reasons. First of all, the unit can be assembled independently of the flywheel which simplifies and speeds up such operation. The assembly of such unit by means of extensions 20 or their equivalents is desirable and advantageous on the additional ground that the extensions automatically ensure a reduction of the diameter of the annulus of openings or holes 25 or 25a to the diameter 26 of the annulus of holes 2a. This simplifies the attachment of prongs 9 or 9a to the flywheel 2. The extensions 20 are yieldable in the axial direction of the diaphragm spring 5 or 5a but do not yield in the radial direction so that they maintain the eyelets 19 or 19a in optimum positions for attachment to the flywheel. The making of extensions (20a, 20b) as integral parts of the respective prongs 9a contributes to simplicity of the diaphragm spring because it renders it possible to dispense with separate fasteners in the form of rivets, bolts or the like. It is clear that the extensions 20a and/or 20b can constitute straight leaf springs (similar to the extensions 20 or the legs 20' of the extensions 22), or that the extensions 20 and/or the legs 20' can have an arcuate shape with a center of curvature on the axis of the diaphragm spring. The extensions 20, 22 or 20a, 20b share the advantage that they can perform several important functions, namely, of holding the diameter of the annulus of openings 25 or 25a down to the diameter 26 of the holes 2a as well as of tending to urge the pressure plate 4 away from the clutch disc 6 so that the clutch is invariably disengaged when the release member 12 is caused to move the tips of the tongues 11 of the diaphragm spring in the direction of arrow I shown in FIG. 1. In other words, the extensions ensure that the protuberances 8 of the pressure plate 4 remain in uninterrupted contact with the diaphragm spring.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. For attachment to a rotary torque-transmitting element, such as a flywheel, a pull-type friction clutch, comprising a diaphragm spring having an annular main section constituting or forming part of a first conical frustum, alternating tongues and slots extending inwardly from said main section, prongs extending outwardly from said main section and arranged to be secured to the torque-transmitting element, said prongs constituting or forming part of a second conical frustum, openings disposed between the slots and the prongs, as considered in the radial direction of the spring, and intermediate portions disposed in the region of said openings and constituting torsion zones between said conical frusta to facilitate changes of the conicity of said first conical frustum with reference to the conicity of said second conical frustum; a pressure plate movable axially of the torque-transmitting element under or against the bias of said spring when said prongs are secured to the torque-transmitting element; and a clutch disc adjacent to said pressure plate and arranged to be biased by the latter when the prongs of said spring are secured to the torque-transmitting element and said pressure plate is biased by said spring, said spring having a portion disposed inwardly of said prongs and arranged to bias said pressure plate toward said clutch disc.

2. The friction clutch of claim 1, wherein each of said openings has an arcuate shape.

3. The friction clutch of claim 1, wherein each of said prongs is disposed radially outwardly of a different one of said openings and each such opening has first and second end portions respectively extending clockwise and counterclockwise beyond the corresponding prong, as considered in the circumferential direction of said annular main section.

4. The friction clutch of claim 3, wherein the length of each of the first and second end portions of each of said openings exceeds half the width of the respective prong, as considered in the circumferential direction of said annular main section.

5. The friction clutch of claim 3, wherein said openings are provided in an annular portion of said spring and the combined length of said openings, as considered in the circumferential direction of said annular main section, at most equals two-thirds of said annular portion.

6. The friction clutch of claim 1, wherein said openings are disposed radially inwardly of said annular main section.

7. The friction clutch of claim 1 for attachment to a torque-transmitting element having a first annulus of holes for fasteners which secure said prongs to the torque-transmitting element, wherein said prongs have a second annulus of holes for fasteners, the diameter of one of said first and second annuli being different from the diameter of the other of said first and second annuli when said prongs are not fastened to the torque-transmitting element.

8. The friction clutch of claim 7, wherein the diameter of said second annulus exceeds the diameter of said first annulus when said prongs are not secured to the torque-transmitting element.

9. The friction clutch of claim 8, wherein said intermediate portions of the diaphragm spring are twisted when said prongs are secured to the torque-transmitting element so that the diameter of said second annulus matches the diameter of said first annulus.

10. The friction clutch of claim 9, wherein said diaphragm spring is flexible in the region of said intermediate portions in response to changes in conicity of at least one of said conical frusta while said prongs are secured to the torque-transmitting element.

11. The friction clutch of claim 1, wherein said diaphragm spring further comprises substantially strip-shaped extensions extending substantially circumferentially of said annular main section.

12. The friction clutch of claim 11, wherein said extensions are integral parts of said diaphragm spring.

13. The friction clutch of claim 11, wherein said extensions are spaced apart from said annular main section.

14. The friction clutch of claim 11, further comprising means for securing said extensions to said pressure plate.

15. The friction clutch of claim 11, wherein said extensions have an arcuate shape.

16. The friction clutch of claim 11, wherein said extensions are provided on said prongs.

17. The friction clutch of claim 1, wherein the number of said tongues exceeds the number of said prongs.

18. The friction clutch of claim 1, wherein each of said prongs is aligned with a different one of said slots, as considered in the radial direction of said annular main section.

19. The friction clutch of claim 1, wherein each of said prongs includes first and second portions respectively extending axially and radially of said annular main section.

* * * * *